United States Patent [19]
Vales et al.

[11] Patent Number: 5,624,552
[45] Date of Patent: Apr. 29, 1997

[54] IN-GROUND WATER TREATMENT SYSTEM

[75] Inventors: Enoch S. Vales; John A. Cherry, both of Waterloo, Canada; David J. Lang, Beverly, Mass.

[73] Assignee: University of Waterloo, Waterloo, Canada

[21] Appl. No.: 199,588

[22] Filed: Feb. 22, 1994

[30]    Foreign Application Priority Data

Feb. 22, 1993 [GB]    United Kingdom .................. 9303537

[51] Int. Cl.$^6$ .............. E02B 11/00; E02D 31/02
[52] U.S. Cl. ................ 210/170; 210/747; 405/52; 405/128
[58] Field of Search ................... 210/170, 747; 405/52, 128

[56]            References Cited

U.S. PATENT DOCUMENTS

| | | | |
|---|---|---|---|
| 4,704,048 | 11/1987 | Ahlgrimm | 210/170 |
| 4,880,333 | 11/1989 | Glasser et al. | 210/170 |
| 5,143,606 | 9/1992 | Bernhardt | 210/170 |
| 5,143,607 | 9/1992 | Bernhardt | 210/170 |
| 5,302,286 | 4/1994 | Semprini et al. | 210/170 |
| 5,318,698 | 6/1994 | Bernhardt | 210/170 |
| 5,318,699 | 6/1994 | Robertson et al. | 210/170 |

*Primary Examiner*—Neil McCarthy
*Attorney, Agent, or Firm*—Anthony Asquith & Co.

[57]            ABSTRACT

A barrier of sheet metal elements in pile-driven into the ground in the path of contaminated groundwater. The barrier serves to funnel the contaminated water into an aperture in the barrier, in which is located a receptacle. A caisson is driven into the ground at the aperture, and the soil etc. removed from inside. A receptacle is lowered into the empty caisson, and a seal is provided whereby, when the caisson is removed the receptacle is sealed to the barrier. Baskets containing treatment material may be lowered into and hoisted out from the receptacle. Rubber seals seal the basket to the receptacle.

13 Claims, 11 Drawing Sheets

IN-GROUND WATER TREATMENT SYSTEM

This invention relates to the treatment of contaminated groundwater, and particular to the treatment of groundwater while the water remains in the ground.

The invention relates to the treatment of the groundwater by non-chemical processes, such as filtration of suspended solid contaminants or sorption of dissolved contaminants. The invention is also applicable to the treatment of a suspended or dissolved contaminant by microbial, chemical, microbiological, or biochemical breakdown and transformation of the contaminant. The invention is applicable in the case where the transformation of the contaminant is to a solid, whether toxic or non-toxic, which precipitates out of the water.

The invention is applicable to the treatment systems in which the treatment process affects the treatment material to such an extent that, after a time, the treatment material must be replenished or replaced.

In some treatment system, with a particular contaminant, even though only tiny traces of the contaminant are present in the water, the treatment material is nevertheless heavily affected by the treatment process and needs to be replaced from time to time. The invention may be applied to each cases.

In some treatment systems, the treatment material tends to consolidate after a time, or to become otherwise physically unsuitable to continue. Here, the treatment material must be periodically replaced, even though the treatment material has been affected only by being in the ground, and not at all by the contaminant. Again, the invention may be applied in such cases.

The invention is applicable when the groundwater is contaminated with a contaminant of such a nature that a residue, after treatment, is present in such large quantities that the sheer volumetric presence of the residue tends, after a time, to impede the treatment. In this case, the need arises periodically to remove the residue. It is an aim of the invention to provide a treatment system in which the treatment materials (whether filtration, sorption, microbial, chemical, etc) can be placed in the ground; in which the contaminated groundwater can be conducted through the treatment materials while remaining in the ground; and in which the treatment material may be lifted out of the ground for disposal or replenishment.

In some treatment systems, the treatment of the contaminant leaves a residue, for example a solid precipitate, within the treatment material. In this case, the invention permits the residue to be removed with the spent treatment material.

In other treatment systems, the contaminant is destroyed by chemical, biochemical, microbial, etc. action upon passing through the treatment material. In these treatment system, if the treatment material deteriorates after a time and has to be replenished, the invention is equally applicable, but there is then no residue to be disposed of.

In the invention, the means for lifting out the material for disposal or replenishment comprises a removable basket. In use, the basket resides in a receptacle installed in the ground, and which remains in the ground when the basket is removed.

One of the problems with such a removable basket lies in the fact that the basket needs to be sealed with respect to the receptacle. The designer should make it impossible for the contaminated groundwater to flow around the basket, i.e. between the basket and the receptacle, and thus by-pass the treatment material placed in the basket. The seal between the basket and the receptacle should be such that the seal can be renewed when the removable basket is replaced.

In fact, the manner of sealing the basket into the receptacle should be highly reliable, and should be easily seen to be so. In a case where there is, for instance, a legal requirement to clean up a body of contaminated water, a judicial tribunal may need to be assured that all the water has passed through the treatment material in the basket.

To ensure that all the contaminated water passes through the treatment system, a barrier is placed in the path of the plume of contaminated water, and the basket of treatment material is placed in an aperture formed in the barrier. The barrier acts as a funnel to guide the contaminated water through the aperture.

The barrier is of the leakproof or watertight type. Preferably, the barrier comprises rolled steel elements, pile-driven vertically down into the ground, and preferably the joints between the elements are such that the joints can be made waterproof. Preferably, the joints between the pile-driven elements of the barrier are of the highly-leakproof kind shown and described in British patent publication GB-2228760 (VALES, Sep. 5, 1990).

Not only does the barrier have to be watertight in itself, but the designer should see to it that the manner in which the barrier is attached to the receptacle, at the edges of the aperture, also ensures watertightness. It may be noted, in a groundwater treatment system, that where would be little advantage to taking precautions to constrain the water to pass through the treatment material if the barrier itself were not watertight.

If appropriate, the barrier may include more than just the one aperture. Also, if appropriate, each aperture may include more than one basket of treatment material. The designer will usually arrange the different baskets in the aperture so that water passes through the baskets in series.

In some cases, not all the baskets at an aperture need to be removable. For instance, one basket may contain treatment material for dealing with a bulk contaminant, in which case the treatment another basket at the same aperture may be dealing with a trace contaminant, in which case the treatment material for that contaminant will last more or less for ever.

By way of further explanation of the invention, examples of systems which embody the invention will now be described with reference to the accompanying drawings.

The systems showing in the accompanying drawings and described below are examples which embody the invention. It should be noted that the scope of the invention is defined by the accompanying claims, and not necessarily by specific features of exemplary embodiments.

Figure 1:
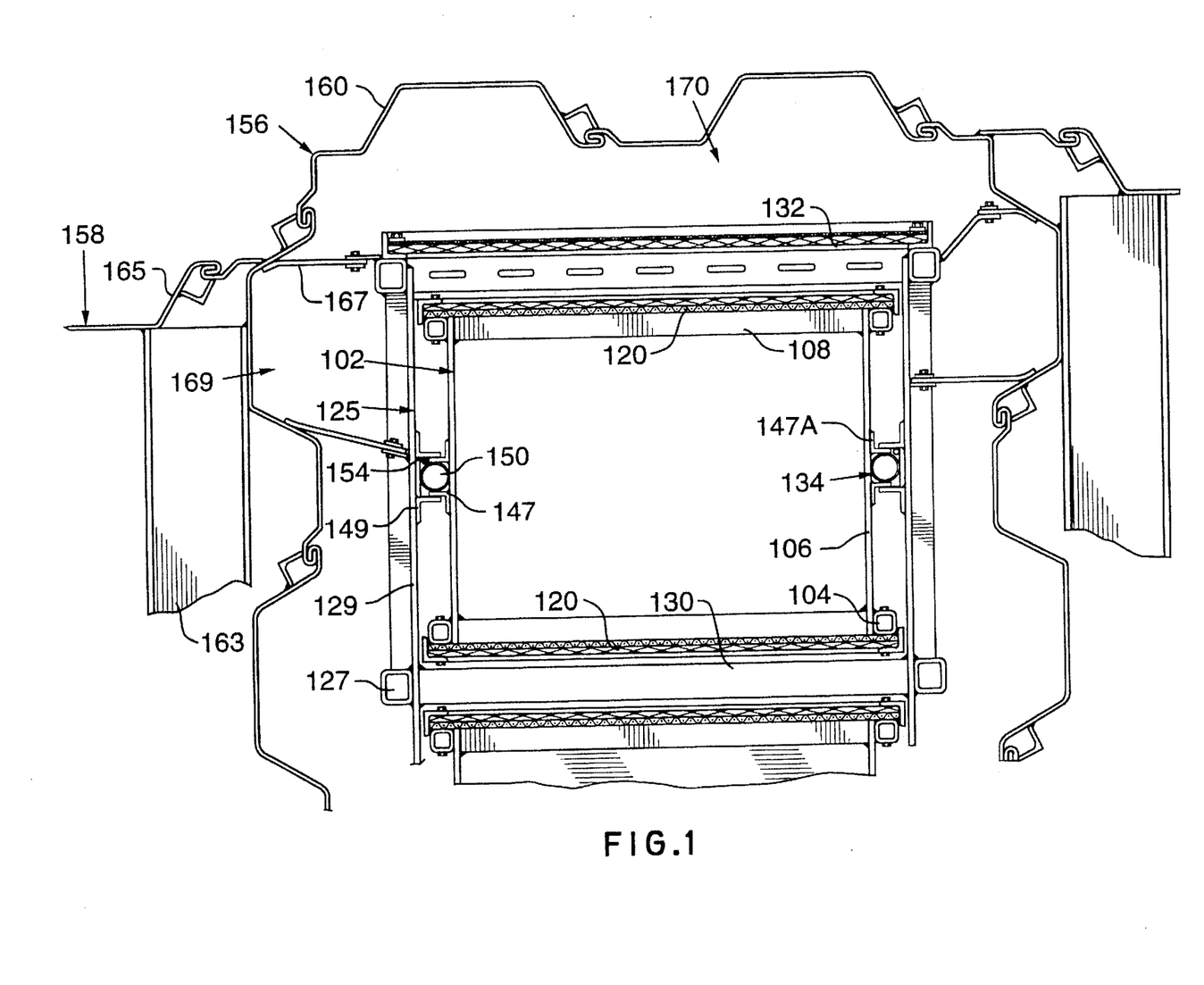
FIG. 1 is a plan view of a first exemplary treatment system that embodies the invention, in which the treatment material is contained in a take-out basket, and shows a stage during the construction and installation of the system.

The treatment system of FIG. 1 includes a take-out basket 102. The structure of the basket 102 may be described as follows. Four corner posts 104 are provided, between which are secured plates of the sheet metal 106, which constitute the sides of the basket. The sides of the basket are watertight.

Braces 106 are welded in a ladder arrangement between the upright corner posts, to define the front and rear of the basket. Screens 120 are secured to the corner posts and braces, whereby water can enter and leave the basket through the screens and can flow through the basket 102 from front to rear.

A watertight welded-in floor 123 is provided at the bottom of the basket 102. In operation, the basket is filled with the treatment material, which rests on the floor 123, and also partly on the braces 108.

The system is so arranged that the basket 102 can be drawn out of the ground, for the purpose of replenishing the treatment material, or for general servicing.

The basket, when in the ground, resides in a receptacle 125. The receptacle 125 also includes posts 127, side plates 129, cross-braces 130, and front and rear screens 132. The whole of the receptacle structure 125 remains in the ground when the basket 102 is removed.

A side-seal 134, which is described below, extends down between the side plate 106 of the basket and the corresponding side plate 129 of the receptacle. A floor-seal 136 (FIG. 5) seals the floor 123 of the basket 102 to the structure at the bottom of the receptacle 138.

Figure 3:
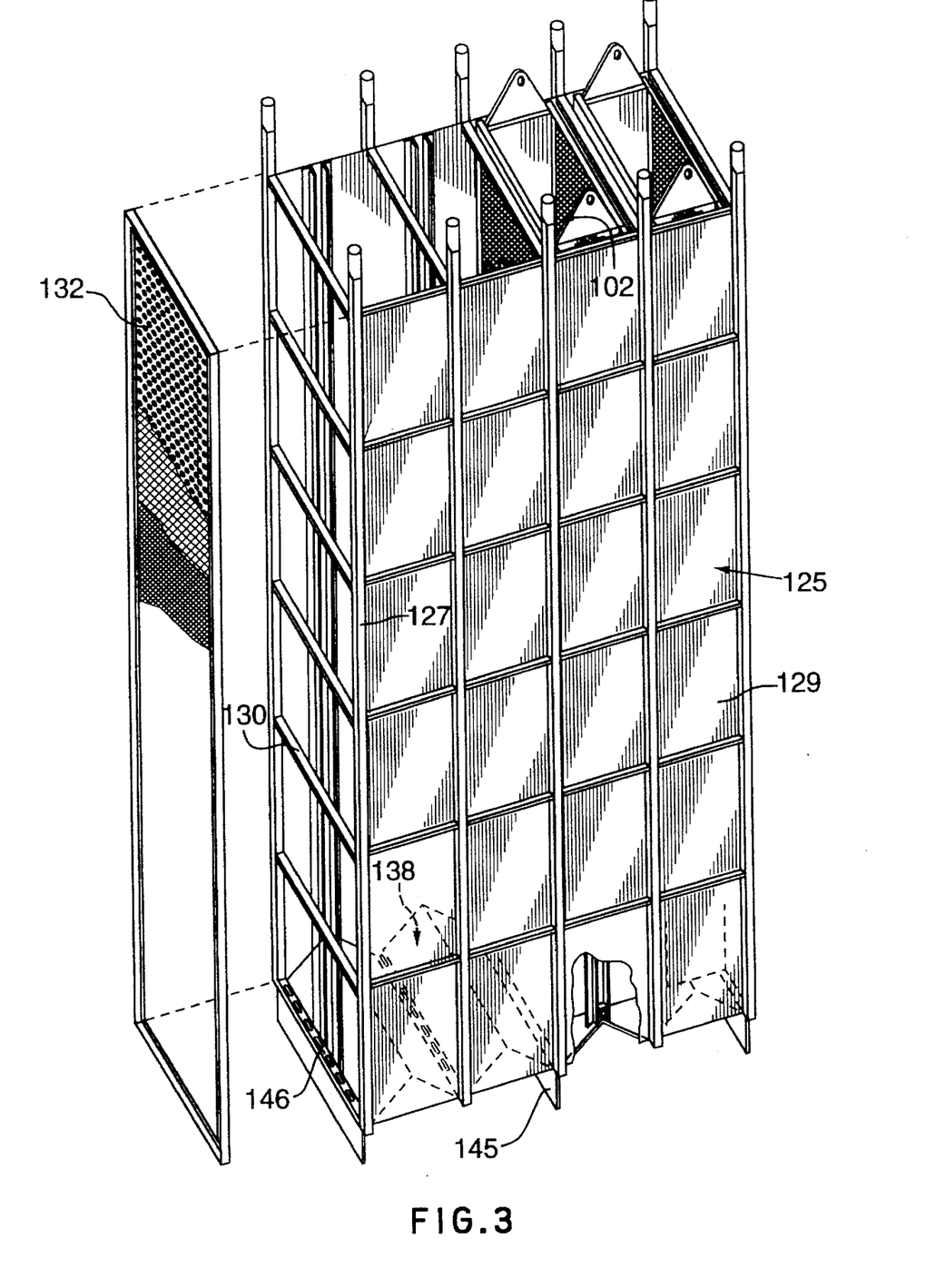
FIG. 3 is a pictorial view of some of the components of the first system.
Figure 5:
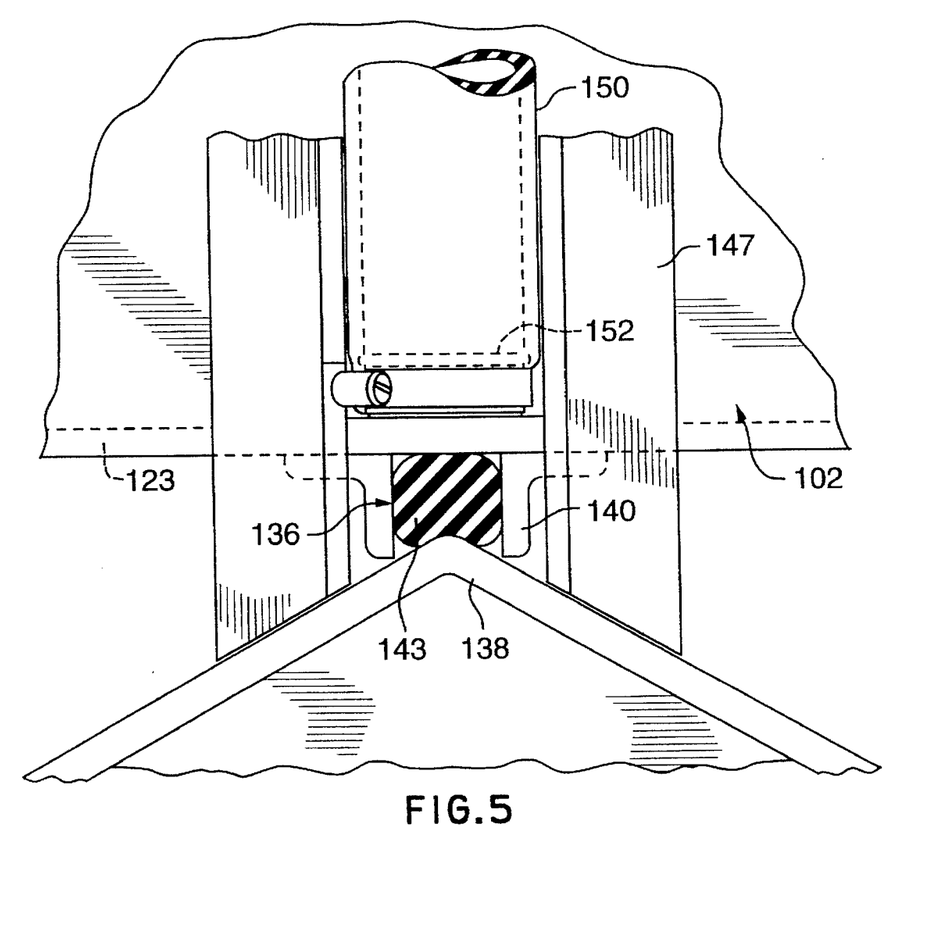
FIG. 5 is an elevation of the area at the foot of the take-out basket, showing another aspect of the means for ensuring a watertight seal for the take-out basket.
Figure 6:
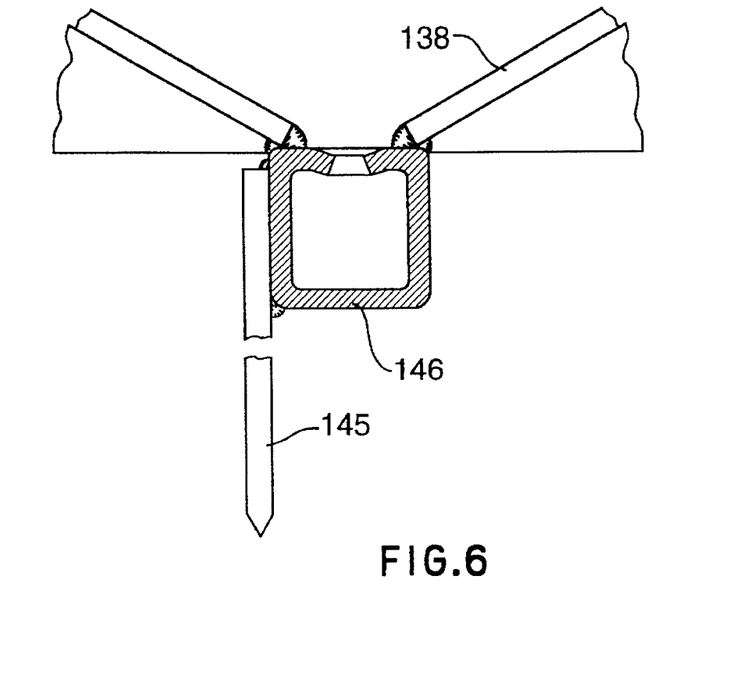
FIG. 6 is another elevation of the area of the foot of the take-out basket, showing a means for flushing dirt away, which may have accumulated in the bottom of the receptacle.

FIG. 5 shows the arrangement of the floor seal 136. The bottom of the receptacle structure (shown also in FIG. 3 is made with a number of sheds 138, one per basket. The floor 123 of the basket is formed with a pair of angle strips 140, which are arranged, when the basket is in position in the receptacle, to rest straddling the corresponding shed 138. A round road of soft rubber 143 is positioned between the angle strips, where it acts to form a seal between the floor 123 and the shed 138. Thus, water is constrained to traverse through the baskets 102, and is prevented for passing underneath the baskets.

In some installations it might be possible (or it might be seen to be not impossible) that groundwater might pass beneath the receptacle 125, and thus escape treatment. Blades 145 are attached to the bottom of the receptacle, and serve to penetrate the clay or other sub-aquifer material when the receptacle is installed, and thus serve to seal underneath the receptacle.

The important point is that the contaminated groundwater should not be able to pass beneath the baskets. But often an aquifer is stratified, whereby the plume is well-defined as to its vertical extent; in this case the plume has a marked tendency not to spread vertically, i.e. not to spread down underneath the baskets, and no sealing below the baskets is required.

In operation of the system, particles of sand and any other materials that might be present, will sink to the bottom of the receptacle 125, and will collect in the troughs between the sheds 138. Trough-tubes 146 are provided with openings through which the particles can enter the trough-tubes. The trough-tubes 146 connect with the posts 127 of the receptacle, the arrangement being such that water, can be drawn up to the surface via one of the posts. The water drawn up the post can be returned via the opposite post, the sand and debris having been filtered out. Thus, debris collecting in the trough can be flushed out.

The side plate 106 of the basket 102 is provided with a pair of welded-on angle-strips 147 which engage between complementary angle-strips 149 on the receptacle 125. The nominal dimensions of the basket and receptacle are such that the basket has a degree of material float between the sides of the receptacle. This float should be large enough to accommodate such distortions of the receptacle as may arise during its manufacture, and from its installation in the ground. The designer's aim should be to keep this float to a minimum, because the side seal 134 has to seal the side of the basket to the side of the receptacle, and has to accommodate the said float.

The side seal 134 includes an inflatable rubber tube 150, which is sealingly attached to a spigot 152 (FIG. 4) at the foot of the basket 102. The tube 150 is accessible from the surface, and can be filled with water (or other liquid); when the water is pressurised (by applying air pressure to the liquid, at the surface), the tube 150 expands to seal the area between the sides 106, 129. As will be understood from the drawings, the rubber tubes 150 on each side of the basket can inflate by different amounts as dictated by the position of the basket within its lateral float, within the receptacle 125. To avoid large pressure differentials, it will usually be preferred to fill the tubes 150 with water; however, it is hard to detect a leak if water is used; if air is used, the presence of bubbles clearly indicates a leak.

Figure 4:
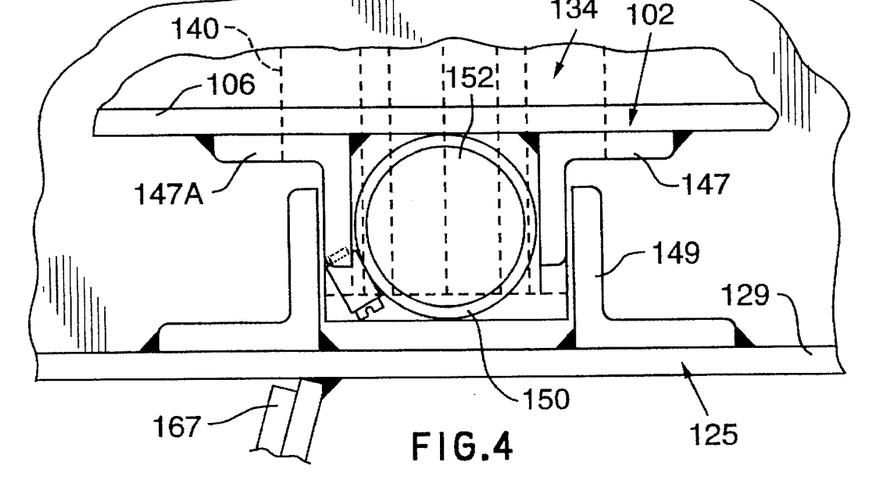
FIG. 4 is a plan view of a portion of the first system, showing a means for ensuring a watertight seal between the take-out basket and the in-ground receptacle in which the basket is received.

The side seal 134 seals the sides of the basket 102 and the floor seal 136 seals the floor of the basket. With these seals in place, it will be understood that a small unsealed area remains at the bottom corners of the basket 102. This small area is sealed by passing a pipe 154 down alongside the inflatable tube 150, right down to the corner area, and by injecting sealing material, such as bentonite, through the pipe 154. One of the angle strips 147A is smaller, to provide room for the pipe.

The receptacle 125 remains as a permanent fixture in the ground as the basket 102 is inserted and withdrawn. The receptacle 125 must be of a robust nature, in that any distortions or deflections of the receptacle that may be present must still allow the basket to be inserted and withdrawn. Similarly, the receptacle must be inserted into the ground in such a manner that the receptacle is not unduly distorted by the process of inserting the receptacle into the ground. Furthermore, the receptacle must be sealed into the ground in such a manner that water cannot escape the treatment system by flowing around the receptacle.

Figure 2:
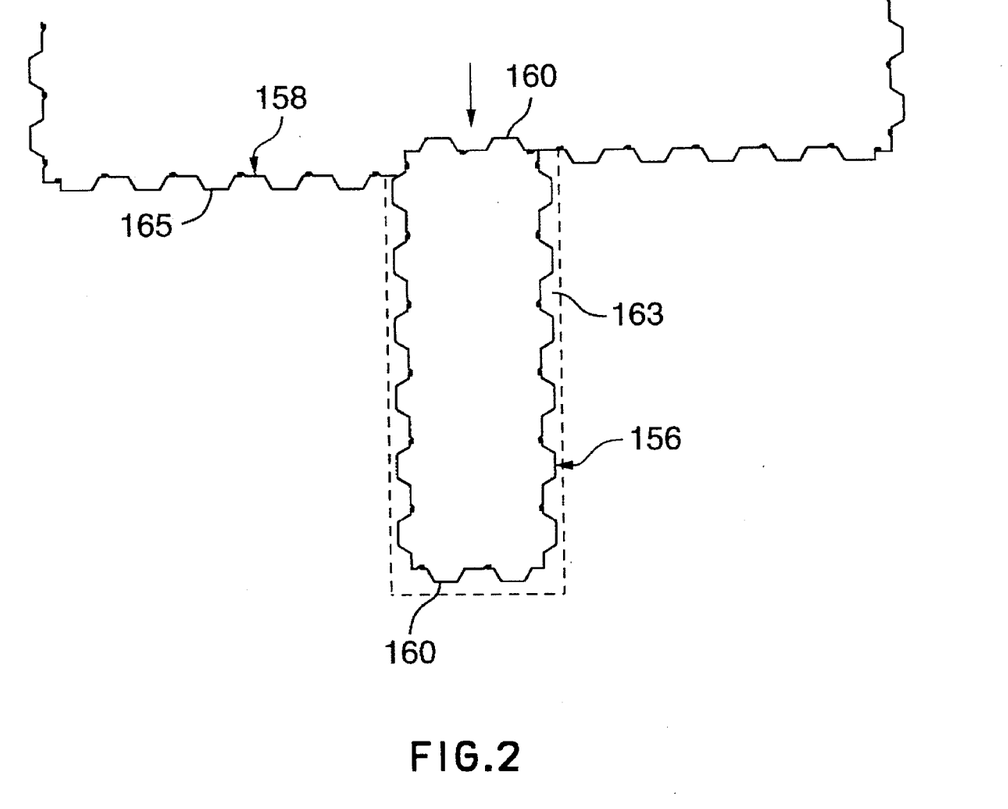
FIG. 2 is a small-scale plan view, showing another stage of construction/installation of the first system.

For these reasons, to promote trouble-free installation and operation, the receptacle 125 is placed inside another structure, i.e. a caisson 156, which is driven into the ground. FIG. 2 shows this caisson, and its sealed relationship to the barrier 158. The caisson, upon initial insertion, forms a complete sealed enclosure, as shown in FIG. 2.

The front and rear walls 160 of the caisson 156 are impermeable. These walls will be removed later. The enclosure defined by the caisson is watertight, the joints between the pile driven sections of the caisson being hosed out and filled with sealant, preferably using the system as described in GB-2226760 (VALES, Sep. 5, 1990).

Once the caisson 156 is installed and made watertight, material from inside the caisson is excavated and removed to an appropriate depth. When that has been done, the receptacle 125 is lowered into the empty caisson.

In the treatment systems described above, the receptacle is not placed directly in the ground, but is installed inside a caisson. The benefit of using a separate caisson is that the material inside the caisson may be removed, and the receptacle is then simply toward into an empty hole. Therefore, the receptacle can be expected to be reasonably free from distortion—as compared with, say a receptacle that has been hammered into the ground. The use of the caisson, however, adds to the expense, and the caisson must be removed prior to operation of the treatment system. In some cases, it is possible to install a receptacle directly in the ground, i.e. without a caisson, and yet the receptacle is not subject to violet installation forces that might distort it.

The sides of the caisson 156 are provided with large beams 163 which are welded to the sides and to the adjacent elements 165 of the barrier 158, and which serve to maintain the tops of the caisson sections in correct alignment. The beams 163 are welded in place after the caisson has been driven into the ground, and before material is removed from inside the caisson.

The front and rear walls 160 of the sealed caisson 156 are removed after installation of the receptacle 125. The screens 132 prevent solid material in the aquifer from entering the receptacle, but the plume of contaminated water flows through the receptacle.

The accuracy with which the caisson elements lie in the ground cannot be expected to be high. Therefore, the "fit" of the receptacle 125 into the caisson 156 must be provided with a large margin for inaccuracy, to ensure that the receptacle can be inserted right down to its working depth inside the caisson, and to ensure that the receptacle can be sealed to the caisson under the conditions of misalignment, distortion, etc. that are likely to be encountered when driving sheet metal pilings into the ground.

Thus the side seal between the caisson 156 and the receptacle 125 must accommodate a greater degree of misalignment and mismatch than the side seal 134 between the receptacle 125 and the basket 102. On the other hand, the side seal between the caisson and the receptacle is made only once, whereas the side seal 134 between the receptacle and the basket must be checked, and if necessary renewed or restored, each time the basket is inserted and taken out.

The side seal between the caisson 156 and the receptacle 125 is effected by the provision of flaps of rubber 167 which engage recesses in the caisson walls. The rubber is not intended itself to act as a watertight seal, but rather to define a container or compartment 169 into which sealant can be inserted. When the receptacle is in place in the caisson, bentonite or the like is inserted from the surface down into the compartment 169. To seal underneath the receptacle 125, a layer of bentonite can be placed on the floor of the caisson 156 just before the receptacle is lowered into the caisson. The floor seal bentonite should be arranged to connect with the side seal bentonite. Steps should be taken to prevent the bentonite getting into the area of the screens 132.

With the receptacle 125 sealed in place in the caisson 156, fine gravel is inserted into the space 170 between the walls 160 and the screens 132 of the receptacle. The front and rear walls 160 of the caisson are then removed.

The screens 132 of the receptacle 125 should be robust, and should be supported, as at 130, to prevent bowing-in of the screens under the pressure of the weight of the gravel outside the screens. The screens 120 of the basket 102 likewise are protected by the braces 108, and are designed to contain such pressure as may arise from the presence of the material inside the basket. Both the screens 132 and 120 preferably may be of multiple layers of mesh.

Using a caisson made from the sealable piles is advantageous in cases where the engineer might wish to provide facility for changing the receptacle. Even after the front and rear walls 160 have been removed, it is generally possible to put these walls back into the ground, allowing the area inside the caisson to be cleared and the receptacle removed. With other types of caisson, once the caisson has been removed from the ground it is not practical or economical to put it back, leaving the receptacle as a permanent fixture in the ground. It might be considered that a separate receptacle is not required, that the basket can be inserted straight into the caisson. The benefits of the separate receptacle are: that the screens need not be present in the components that are pile-driven into the ground, i.e. that the screens are present only in the receptacle and basket, which are lowered into a hole which contains only water, or which does not even contain water; also that, in general, the caisson can be of relatively crude construction, which is suited to its being hammered into the ground, whereas the receptacle can be of more sophisticated, but somewhat less robust, construction; and also another benefit of the separate-receptacle arrangement is that the functions of the side seals are divided and separated, in that the requirement to accommodate relatively gross dimensional misalignment is left to the seal between the receptacle and the caisson, leaving the seal between the receptacle and the basket to accommodate the requirement for a seal that permits the basket to be withdrawn and re-inserted.

When two or more baskets are provided in series within the treatment aperture, one basket should be left in while another is taken out. If all the baskets were removed at once, the contaminated groundwater would, for a time, have free passage through the barrier, and would not be treated.

Figure 7:
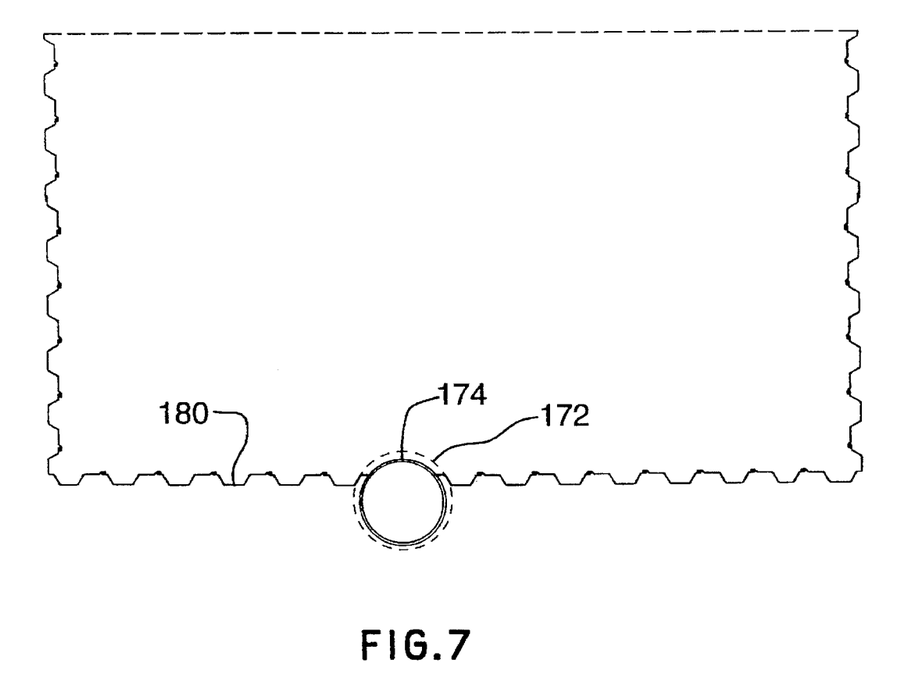
FIG. 7 is a plan view of a second treatment system.
Figure 8:
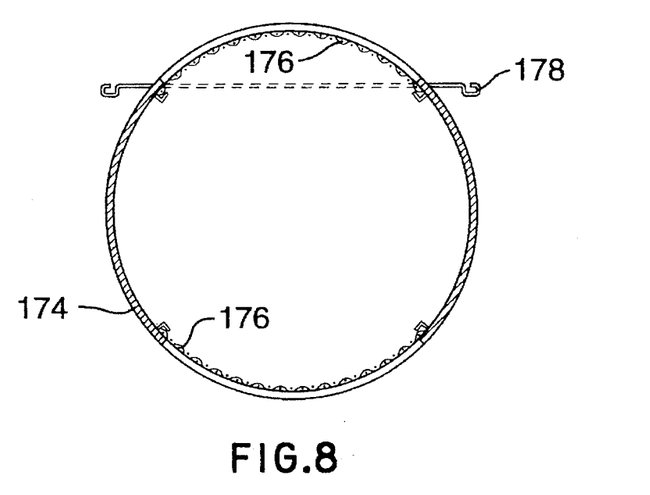
FIG. 8 is a plan view of a component of the second system.
Figure 9:
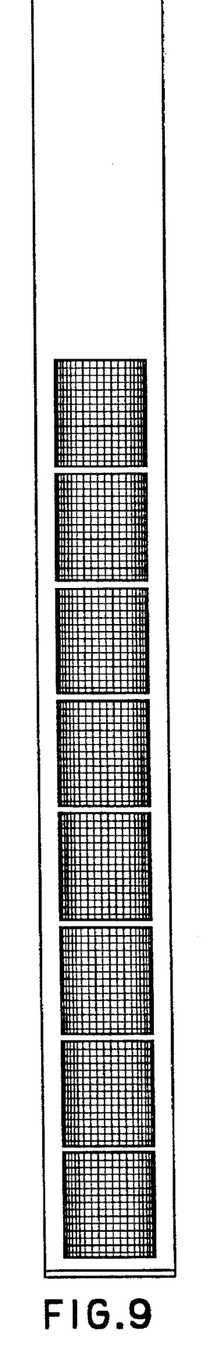
FIG. 9 is a side elevation of the component shown in FIG. 8.

FIGS. 7–9 shows another construction of treatment aperture. Here, the caisson is in the form of a round tube 172. After this caisson tube 172 has ben driven into the ground, the material from inside the tube is excavated and removed. Receptacle 174, with front and rear screens 176, is then lowered into the empty interior of the caisson. The receptacle 174 is shown in plan view in FIG. 8 and in side elevation in FIG. 9. Once the receptacle is in place, and suitably packed and filled into place, the tubular caisson is withdrawn. The receptacle 174 is provided with welded-on stubs 178 having shapes which are complementary to the interlocking edge forms of the sealed barrier elements. The barrier elements 180 are driven into the ground on each side of the receptacle, thereby forming a sealed funnel. The withdrawable basket (not shown in FIG. 7) is sealed to the inside of the receptacle 174 in a similar manner to that described in relation to the system of FIGS. 1–6.

Figure 10:
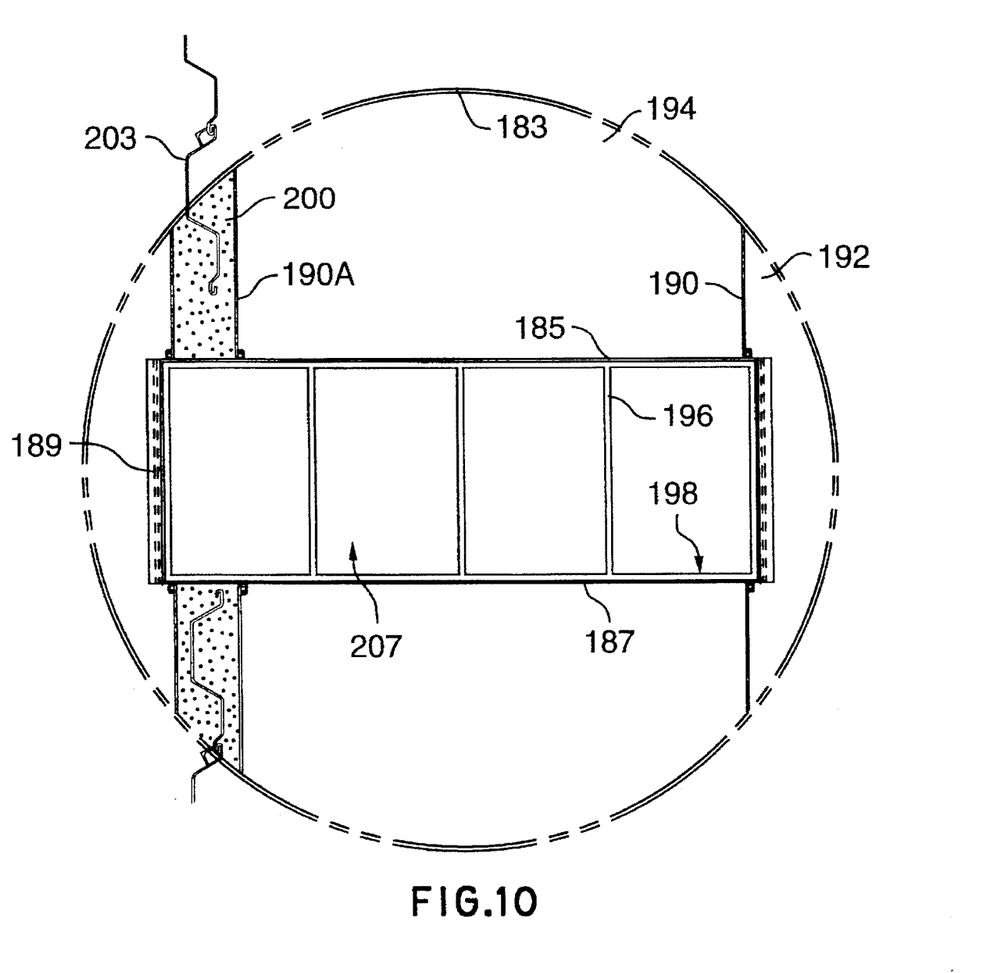
FIG. 10 is a plan view of a third treatment system.

The system shown in FIG. 10 takes advantage of the fact that caisson of a 3 metres diameter, and the equipment for driving them into the ground, are in common use. Here, the caisson 163 is in one piece, and is driven into the ground as a unitary whole. When driven, such a caisson can be expected to remain as a more or less right cylinder over its full inserted depth, provided the soil and ground material is reasonably homogeneous and free from large rocks etc. which might tend to deflect the caisson.

With the caisson 163 fully inserted in the ground, the interior of the caisson is emptied of all soil and other solid material, and, to make installation of the receptacle easier, is emptied of water. Next, a receptacle 185 is lowered down into the caisson. As mentioned, the one-piece cylindrical caisson 183 is solid enough that it can be expected to maintain its shape with reasonable accuracy upon being driven into the ground, and so only a comparatively small margin or tolerance need be allowed to ensure that the receptacle 185 can slide all the way to the bottom of the caisson 183.

The receptacle 185 of FIG. 10 comprises a frame and side panels 186, similar to those of FIG. 1. Screens 189 are included in the front and rear of the receptacle.

The receptacle 186 is provided with welded-on arms 190, which extend (almost) for the interior surface of the caisson 183. The arms 190 extend over the full height (i.e. depth) of the receptacle 185.

With the receptacle nestling snugly inside the caisson, fine gravel is poured into the spaces 192 contiguous with the screens 189. The gravel used is permeable or porous, and may be expected to remain so over a long period, and in use will conduct the groundwater flow rapidly through the screens.

At the sides of the receptacle 185, the spaces 194 between the interior surface of the caisson 183 and the side panels 187 of the receptacle will perform no part in the treatment of the groundwater, and these spaces 194 may be filled with any suitable material: it is convenient to use the soil that was removed from inside the caisson as the material to backfill the spaces 194.

It will be understood that the receptacle 185 is a single structure, which is lowered as a unitary whole down into the (empty) caisson 183. The rectangular frame of the receptacle with its cross-bars 196, the front and rear screens 189, the side panels 187 with their guiding/sealing assemblies 198, and the arms 190, are all built-in components of the receptacle structure. The side panels 187 are of sheet steel, which of course is waterproof, so that water can only flow through the receptacle via the front and rear screens 189; water cannot enter or leave the receptacle through the side panels. The floor of the receptacle also is made watertight.

The arms 190 serve to delineate the gravel 192 areas from the backfill 194 areas. The arms 190A are arranged to define cavities 200, which extend over the whole height of the receptacle 185. With the caisson 183 still present, these cavities 200 are enclosed all around, and the cavities are filled with bentonite by pouring the bentonite in from above. The bentonite may be in the form of chips or powder. When the caisson is removed, the cavities 200 are now open laterally to the aquifer. The bentonite in the cavity 200 is used for the purpose of sealing the elements of a pile-driven barrier to the receptacle 185. It will be noted that the end element 203 of the barrier does not need to engage tightly with the receptacle 185; so long as the end element 203 lies in the cavities 200 between the arms 190A, a watertight connection is formed between the barrier and the receptacle.

The cavities 200, when filled with bentonite, serve as a means for providing a watertight seal between the receptacle 185 and the waterproof barrier element 203, which does not require an intimate physical or mechanical interaction between the two. This is especially appropriate at the junction between the barrier sheets and the receptacle, with their quire different manners of construction, and quite different ways so responding to distortions and other stressful movements.

The arms 190, 190A are not completely rigid, in the context of the receptacle 185 and the caisson 183. Thus, if the receptacle should be somewhat tight in the caisson, due to a slight distortion for example, the arms can accommodate by bending a little. Therefore, the designer can make the arms nominally quite a tight fit in the caisson, which means that the ends of the arms make quite a good seal with the inside wall of the caisson. In turn, this means that the bentonite inserted into the cavities 200 will not be likely to leak out. Thus, when the barrier elements are to be inserted into the body of bentonite in the cavity, it can be assured that the body of bentonite will be complete.

When the caisson 183 is removed, the barrier elements 203 can be installed.

As mentioned, the caisson 183 is readily available as a standard item up to about 3 metres in diameter. The caisson is of such robust construction that it can be pile-driven into the ground, and removed therefrom, many times. As can be seen from FIG. 10, a caisson of this size is able to receive a receptacle which can accommodate four good-sized baskets 207 in-line. The baskets 207, upon being lowered into the receptacle 185, are sealed to the receptacle in the manner as described with reference to the previous drawings.

Figure 11:
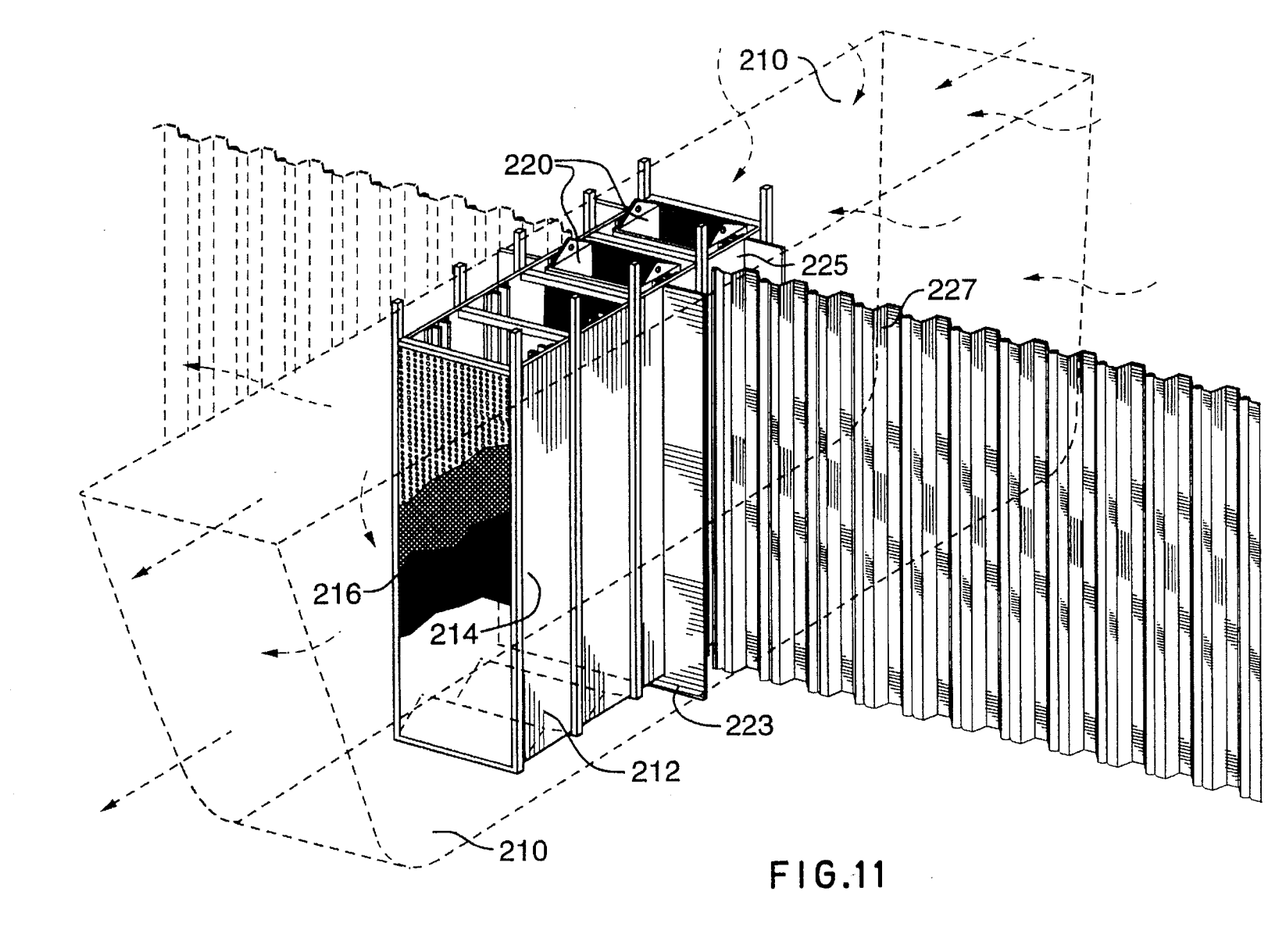
FIG. 11 is a pictorial view of a fourth treatment system.

FIG. 11 shows another structure for receiving removable baskets. Here, a ditch or trench 210 is first excavated into the aquifer material, and the trence is filled with degradable mud, such as REVERT (trade name). Such degradable mud is in common use: the aquifer material into which the trench 210 is excavated is often incapable of structure cohesion, especially when saturated, and the degradable mud serves to maintain the integrity of the walls of the trench. The mud (sometimes called "blue" mud) is fed into the trench as the excavation proceeds, the level of the mud being topped up to the level of the ground. The blue mud has the consistency of a creamy paste.

The receptacle 212 is lowered, as a unitary whole structure, down into the body of mud in the trench 210. As before, the receptacle 212 comprises a frame, side panels 214, and front and rear screens 216. With the receptacle in place, fine gravel is dropped into the mud in the trench in the areas ahead of and behind the receptacle, to funnel the flow of water through the receptacle (and through the four removable baskets 220 placed in the receptacle).

Two arms 223 are provided on each side of the receptacle 212. Bentonite or other sealant is dropped into the cavities 225 formed by these arms. The end elements 227 of a barrier lie in these cavities, and are sealed thereby.

The sides of the trench 210 are filled in around the receptacle with backfill material, such as the soil that was excavated from the trench. The mud quickly starts to biodegrade, and disappears in about a day.

The design shown in FIG. 11, it will be seen, requires no caisson, which can be an advantage if the large caissons are not available. When the caisson is available and is used a hole is created inside the caisson from which all soils and other material may be excavated; the receptacle may then be simply lowered into this empty hole. Therefore, because it is simply lowered into an empty hole, the receptacle need not have the capability of being able to stand up to being hammered into the ground, and also the receptacle, being simply lowered into a hole in the ground, can be expected to remain undistorted and unaffected by the lowering process. In FIG. 11 also, even though there is no caisson, the receptacle is not hammered into the ground, but is simply lowered into an "empty" hole: in fact of course in FIG. 11 the hole is not empty, as such, but contains the degradable mud, but the mud offers substantially no resistance to the receptacle.

Another disadvantage associated with hammering the receptacle directly into the ground, is that the receptacle has the front and rear screens, which have virtually no structural strength. As a general rule, the designer should seek to avoid arranging the system so that components which have screens are pile-driven into the ground: preferably only continuous, solid, robust components should be pile-driven. Thus, the receptacles 125, 174, 185, 212 as illustrated in the various drawings do not require to be pile-driven, themselves, into the ground. Rather, the receptacles are lowered into holes that are either empty, or which contain material into which the receptacle can be lowered basically as if it were being lowered into water. Therefore, the receptacle, even though of relatively flimsy construction, can be expected to remain dimensionally the same after installation as before, i.e. there is little tendency for the receptacle to become distorted during installation.

Figure 12:
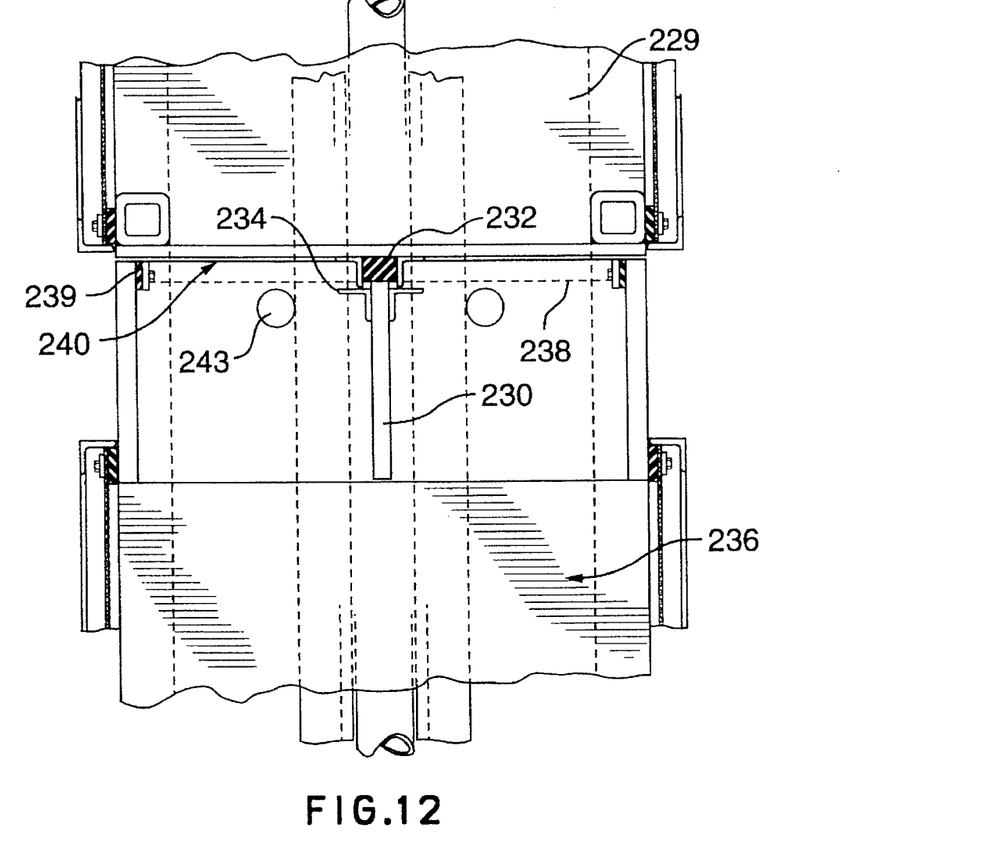
FIG. 12 is a side elevation, in cross-section of a fifth treatment system.
Figure 12A:
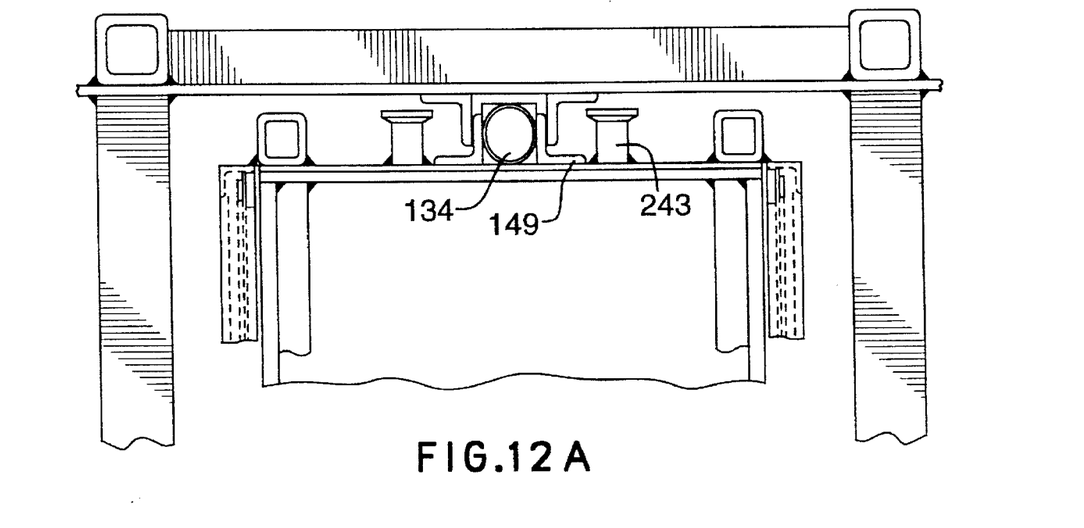
FIG. 12A is a plan view of the area shown in FIG. 12.

In some cases, the plume occupies a large height or depth in the aquifer, to the extent that it becomes inconvenient to provide a basket which is deep enough to extend over the whole height of the plume. In this case, the designer must provide a stack of two or more baskets, piled upon each other. Now, the requirement arises to a seal not only the gaps between the sides of the receptacle and the dies of the baskets, but also to seal the vertical gaps between upper and lower baskets in the stack. FIG. 12 shows a structure for sealing the vertical gap between stacked baskets.

In FIG. 12, a sealing structure like that shown in FIG. 5 is provided underneath the upper basket 229. But instead of a shed, a blade 230 is provided, which engages the rubber rod 232. Angle strips or flanges 234 serve to guide the blade 230 into engagement with the rubber 232, and to (partially) support the (considerable) weight of the basket 229. The blade 230 dips into the treatment material 236, whereby contaminated water must traverse through the material 236, even if the material within the basket should settle.

It should be noted that generally the level of the treatment material in the baskets will reduce over time. Some of the treatment processes cause the material to be used up, which of course causes a volume loss, but in any event the material will settle somewhat in the basket: that is to say, the level of the surface of the material will fall. (In other cases, treatment of the contaminant causes the treatment material to swell.)

The designer should take precautions to make sure that even though the level of the material in the basket may fall, leaving an open space above, none of the water to be treated can by-pass the material. FIG. 12 illustrates how this may be achieved. The blade 230 extends down into the body of the material 236 in the basket. Now, when the level of the material in the basket has settled to the level as shown by the dotted line 238, and even though there is now a volume 240 of plain water above the material, the water cannot flow straight through the basket; rather, the water, in order to pass the blade, has to follow at least a minimum path through the treatment material. The height of the blade 230 should be arranged so that the remaining path through the material, when the material has settled to the maximum extent, is long enough that the water spends a long enough residence time in contact with the treatment material 236 for treatment to take place.

To further ensure an adequate seal all around the gap between the stacked baskets, a further seal 239 is installed. This seal is fastened to the top of the lower basket, and seals against the bottom of the upper basket.

In place of the structure shown in FIG. 12, another means for sealing the vertical gaps between stacked baskets may be described as follows. The means for sealing the gap between the stacked baskets comprises a a slab or mat of bentonite. Now, the top of the lower basket and the bottom of the upper basket are each formed as flat plates. The bentonite mat is placed on the plate on top of the lower basket as it is being lowered into the receptacle, and the mat thereby occupies the gap between the lower basket and the upper basket. Upon contact with water, the bentonite mat swells, and seals between the plates.

Within a few hours after installation, the bentonite mat will be swollen enough to seal the gap between the baskets. The bentonite swells into very good conformance with the surfaces against which it is intended to seal.

It may be noted that the sealing systems used in the treatment system should not require the use of large volumes of sealant such as bentonite. Bentonite is not particularly expensive in large quantities, but, if a large quantity of bentonite is used, the problem can arise of extracting and disposing of the old bentonite from the receptacle when removing and replacing the baskets. It is not so much of a problem that the bentonite would them simply sink into the old bentonite, but rather that the dislodged bentonite might enter the screens of the baskets, and clog the screens. One particular difficulty is that the engineer cannot tell when the screens might be becoming clogged with bentonite.

Therefore, it is preferred, in those designs in which bentonite sealant is used, to make sure the bentonite cannot reach the screens. The rubber flaps 167 in FIG. 1 keep the sealant away from the screens, and the layout of FIG. 10 ensures that any sealant leaking from the cavity 200 would have to traverse a long body of gravel before reaching the screen 189.

Figure 13:
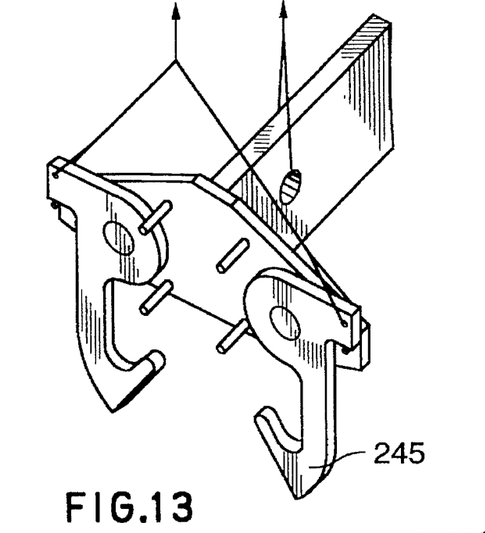
FIG. 13 is a diagram illustrating a basket recovery apparatus.
Figure 14:
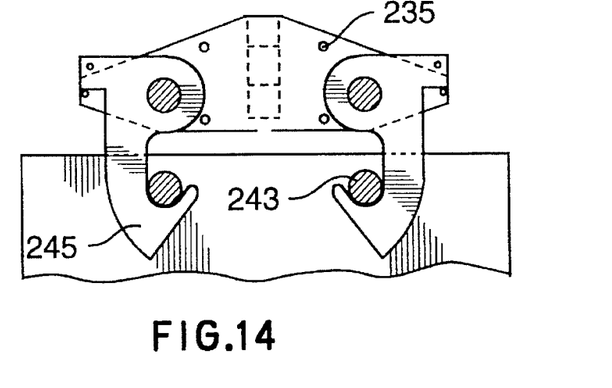
FIG. 14 is a side elevation of the apparatus of FIG. 13, shown in use for recovering the basket.
Figure 14A:
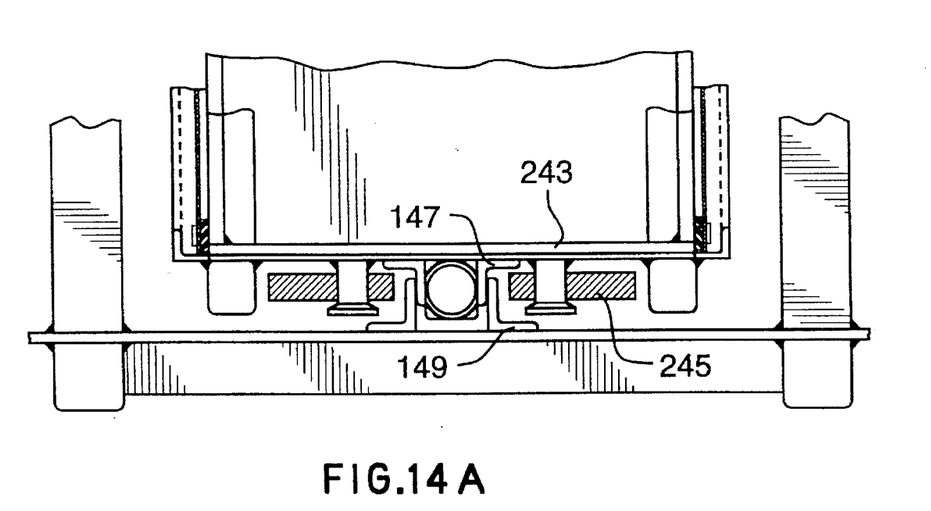
FIG. 14A is a plan view of the apparatus as shown in FIG. 14.

When baskets are stacked on each other, a means has to be provided for mechanically accessing the lower baskets, for extracting them from the receptacle. As shown in FIG. 13, in order to remove the baskets from the receptacle, suitable pick-up hooks are provided. The lower basket is provided with studs 243, which engage with the pivoting hooks 245 as shown in FIG. 13. The lifting apparatus, which carries the hooks 245, is lowered down into the receptacle (the upper basket having been removed), and is guided on the angle strips 149 by pins 235 to the studs 243.

In the case of the stacked baskets, it is recognized that it is difficult to ensure that the sealing means which seals the vertical gap between the baskets makes a perfect seal with the sealing means which seals the sides of the baskets. In this respect, a combination of side seals, such as the seals 134, down the sides of the baskets, with a bentonite mat between the baskets, is advantageous. The bentonite in the mat fills in tiny crannies in the vertical gap, but it would be difficult to apply bentonite to seal a vertical gap, whereas the tube seals 134 easily cope with the vertical gap, bit it would be difficult to access an inflatable tube seal if such were provided between the baskets. Thus, the bentonite-mat type of seal is more suited to the task of sealing between the stacked baskets, whereas the inflatable-tube type of seal is more suited to the task of sealing between the skies of the basket and the sides of the receptacle.

The designer should see to it that the various welded joints are not so arranged that the welded joint is required itself to be leakproof. If a welded joint were required to be leakproof then the joint could not be tack-welded together, as would have to be continuously-welded together. As may be understood from the drawings, all the welded joints as shown which are in the water-leakage line are backed up by sealant, whereby the joints themselves need not be leakproof. Leakproof, i.e. continuous, welded joints would be not only more expensive than tacked joints, but would cause more distortion to the structure. On the other hand, the designer may be less reluctant to call for continuous-welding on the caisson structure, since the designer has to cope with the pile-driven caisson structure being somewhat distorted and out of position in any event. In the case of a component that has to be driven into the ground, the designer must in any event take account of the fact that the component, when so driven and inserted, may be some distance away from its nominal position. In that case, the distortion caused by continuous welding may be accommodated within the margins of misalignment that must have been already allowed for. In that case, continuous welding might be more acceptable. Preferably, the designer should avoid the need for continuous welding of those components which need to be accurately located, but the designer may specify continuous welding (and the consequent avoidance of the need for other kinds of sealing means) if the components are to be driven into the ground.

As discussed, the main aim of the invention is to provide a system whereby contaminants that are taken out of groundwater in the form of solids or precipitates can be collected and removed from the ground, without the water itself having to be taken out of the ground. By funneling the contaminated water through apertures in a sealed barrier, the treatment material can be concentrated or focused, the result being not less treatment material is needed.

The treatment material will usually be mixed with an inert filler, such as gravel. Generally, the more concentrated the treatment material, i.e. the higher the ratio of treatment material to filler, the more efficacious the treatment. A comparison may be made with the case where the water is passed through, say, a plain trench containing the treatment material; in this case, an enormous quantity of treatment material would be needed, especially if the trench were wide enough to provide a good residence time; if the treatment material were dispersed in a filler material in the trench, the trench would need to be very wide to provide a good residence time. Therefore, in the treatment-material-in-a-trench case, either the ratio of treatment material to filler has to be rather low, or an enormous quantity of treatment material has to be provided.

By contrast, in the funneled-apertures system as described, it is not very expensive to provide for a long residence time, by increasing the number of baskets in series. No great quantity of treatment material is required, even though the residence time is long. In the funneled-apertures system, it is economically worthwhile to have a high ratio of treatment material to filler, which leads to a good efficiency of treatment. It is recognized that therefore in a funneled-apertures system it is especially advantageous to provide removable baskets: the treatment material is accessible, the residence time is long, and the treatment effects are concentrated and efficient.

Figure 15:
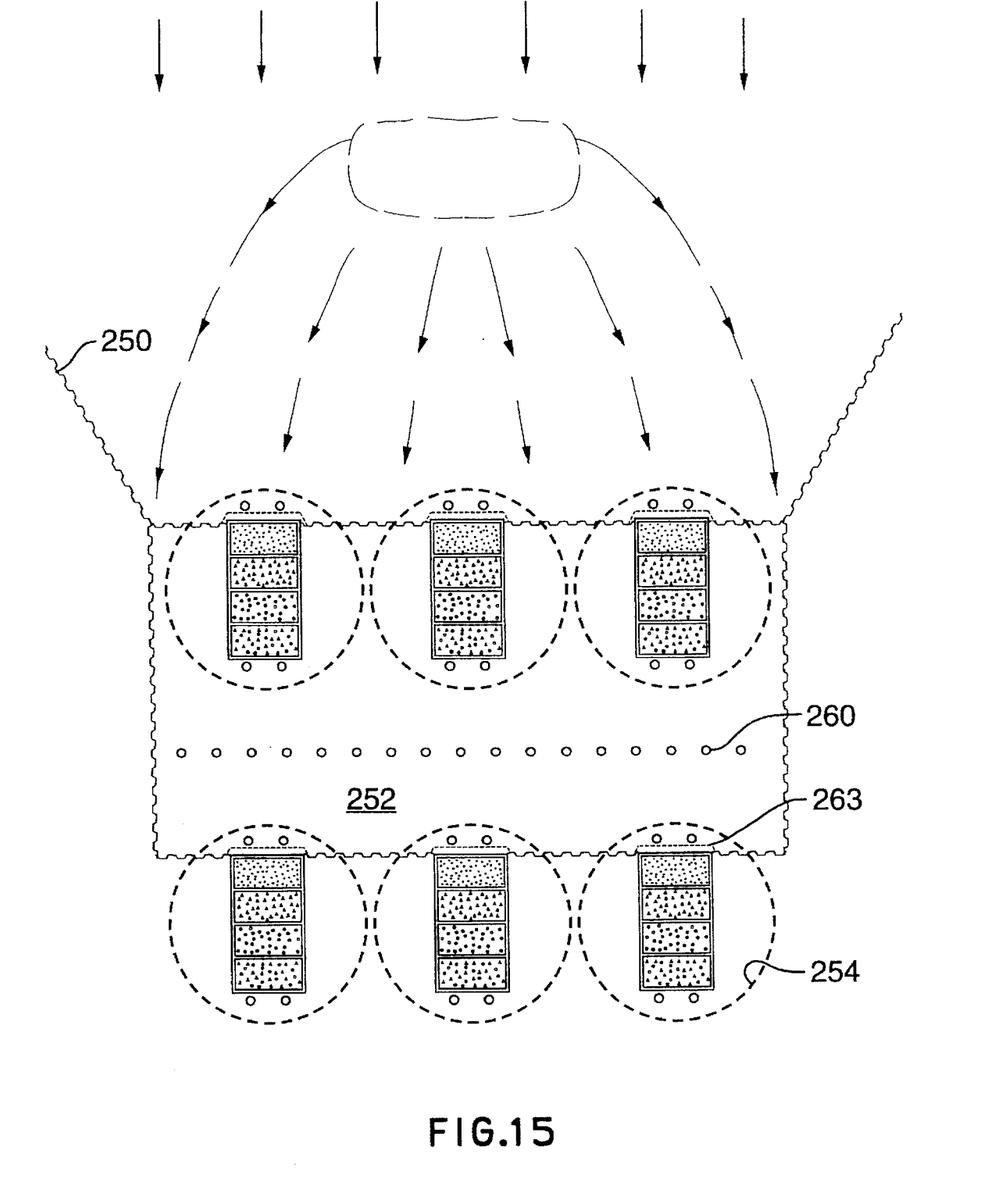
FIG. 15 is a plan view of a site of contaminated groundwater, showing a sixth treatment system.

FIG. 15 shows a treatment system for use in the case where treatment is most difficult. A waterproof barrier 250 is made from sealable elements, as described previously. The elements are arranged to form also an enclosure 252. Six of the installations of the type shown in FIG. 10 are provided. In FIG. 15, the caissons have been removed therefrom, their position being indicated by the dashed lines 254.

At each of the six treatment sites 256, four removable baskets 258 are provided. The four baskets may contain different treatment materials, if appropriate.

Wells 260 are provided for testing the water in the enclosure 252. If necessary, other test wells may be provided in the aquifer ahead of and behind the barrier 250. Under some circumstances, a treatment material, for example a chemical, may be injected into the ground in the enclosure 252 via the wells. Because of the focusing of the treatment of the groundwater within the apertures and the enclosure, it can be economical to provide the kinds of treatment within the confines of the enclosure that would be ruled out on cost grounds if the treatment had to be spread over a large area.

In FIG. 15, shut-off gates 263 are provided. These can be used to ensure that no water passes through the system during periods when the baskets are temporarily out of the ground.

We claim:

1. Apparatus for in-ground treatment of contaminated groundwater, wherein:

the apparatus includes a basket, which is suitable for receiving and containing a body of treatment material;

the basket is provided with a means by which the basket, with the body of treatment material contained therein, may be lowered into the ground, and may be hoisted out of the ground;

the basket is formed with a front wall and a rear wall, and left and right side walls, and the front wall and the rear wall comprise respective screens;

the nature of the basket is such that the treatment material, when present in the basket, rests against the left and right side walls;

the arrangement of the basket is such that water can enter the front screen, flow through the treatment material in the basket, the treatment material being permeable enough to permit the flow of water there-through, and pass out from the rear screen;

the arrangement of the basket is such that water cannot flow through the basket except by flowing through the material present in the basket;

the apparatus includes a receptacle, which is adapted to be installed in the ground, and to remain in the ground when the basket is lowered into, and hoisted out of, the ground;

the receptacle includes a front wall and a rear wall and left and right side walls, and the front wall and the rear wall comprise respective screens;

the receptacle is so constructed and arranged as to define a hollow chamber for receiving the basket;

the arrangement of the apparatus is such that water from in front of the front screen of the receptacle can enter there-through, can pass through the front section of the basket, thence through the body of treatment material, thence through the rear screen of the basket, thence through the rear screen of the receptacle, and out behind the receptacle;

the apparatus includes means for sealing the side walls of the basket to the side walls of the receptacle.

2. Apparatus of claim 1, wherein the treatment material in the basket includes an inactive filler material.

3. System for in-ground treatment of contaminated groundwater passing through an aquifer, wherein:

the system, includes a substantially leak-proof barrier, which is set in the ground, into the material of the aquifer, in the path of the contaminated water;

the system includes an aperture in the barrier;

the arrangement of the barrier and the aperture therein is such that the contaminated groundwater is funneled, by the presence of the barrier, into and through the aperture;

the system includes a receptacle;

the receptacle is set in the ground, at the aperture in the barrier;

the system includes a means for sealing the barrier to the receptacle, and the said means is effective to ensure the system is sealed against the flow of groundwater through the aperture in the barrier other than flow through the receptacle;

the receptacle is of such a construction as to allow water to pass through the receptacle;

the system includes a basket, containing a body of treatment material;

the treatment material in the basket is porous and permeable to the passage of water there-through;

the basket is of such a construction as to allow water to pass through the basket, and through the material contained in the basket;

the structure and arrangement of the basket is such that all water passing through the basket is constrained to pass through the body of treatment material;

the receptacle defines a hollow chamber, and the system includes a means by which the basket may be lowered into, and hoisted out of, the hollow chamber;

and the system includes a means for sealing the basket, when lowered into the hollow chamber, to the receptacle, whereby the system is sealed against the flow of groundwater through the receptacle other than flow through the basket.

4. System of claim 3, wherein:

the system includes at the aperture in the barrier, an excavated hole in the ground material of the aquifer, from which solid ground material has been excavated, whereby the excavated hole is free of solid ground material;

and the receptacle is positioned wholly within the excavated hole.

5. System of claim 3, wherein:

the receptacle has front and rear screens, which are effective to keep solid material present in the aquifer from entering the receptacle, and are effective to allow passage of water through the receptacle;

the basket has front and rear screens, which are effective to keep solid treatment material present in the basket from escaping from the basket, during hoisting and lowering of the basket, and are effective to allow passage of water through the basket.

6. System of claim 3, wherein the means for sealing the basket to the receptacle comprises a body of elastomeric material trapped between, and in sealing contact with, the receptacle and the basket.

7. System of claim 6, wherein the body of elastomeric material includes a hollow inflatable tube, the arrangement of the tube being such that inflation of the tube can be initiated and controlled from above ground.

8. System of claim 7, wherein the body of elastomeric material includes, between the floor of the basket and the floor of the receptacle, a solid bar of soft rubber.

9. Procedure for in-ground treatment of contaminated groundwater passing through an aquifer, wherein the procedure includes the steps:

of providing barrier elements, a receptacle, and a basket containing treatment material;

of installing the barrier elements in the ground so as to form a leakproof barrier in the material of the aquifer;

of providing an aperture in the barrier, the arrangement of the barrier and the aperture therein being such that the contaminated groundwater is funneled, by the presence of the barrier, into and through the aperture;

of excavating a hole in the ground material of the aquifer at the aperture in the barrier;

of removing solid ground material from the excavated hole, whereby the hole is substantially empty of solid ground material;

of installing in the excavated hole a means for preventing the solid ground material of the aquifer around the hole from caving into the hole;

of lowering the receptacle into the excavated hole;

of lowering the basket into the receptacle;

and of sealing the barrier to the receptacle, and basket to the receptacle.

10. Procedure of claim 9, wherein the hole is empty of solid ground material to the extent that the receptacle may be lowered into the hole under its own weight, substantially without downward hammering or driving.

11. Procedure of claim 10, including the steps:

of driving of caisson into the material of the aquifer by downward hammering;

of excavating solid ground material from inside the caisson, whereby the interior of the caisson is substantially empty;

of lowering the receptacle into the empty interior of the caisson;

of packing the receptacle in the caisson with filler material;

and of withdrawing the caisson from the aquifer.

12. Procedure of claim 11, wherein the receptacle includes arms, which extend outwards to the walls of the caisson, the arrangement of the arms being such that a cavity is defined, between the arms and bounded by the caisson;

the procedure includes the step, before withdrawing the caisson from the aquifer, of filling the cavity with water-expanding sealant material;

the procedure includes the step, after removing the caisson from the aquifer, of placing elements of the barrier within the said sealant material, whereby the sealant material serves to seal the elements to the receptacle.

13. Procedure of claim 9, including the steps of filling the excavated hole, during excavation thereof, with degradable mud, and of lowering the receptacle, under its own weight, into the said mud.

\* \* \* \* \*